United States Patent

Eimer et al.

Patent Number: 5,628,898
Date of Patent: May 13, 1997

[54] BACKWASHABLE FILTER HAVING ELEMENTS WITH ELASTICALLY DEFLECTABLE LIPS

[75] Inventors: Klaus Eimer, Ratingen; Hans-Werner Schildmann, Heiligenhaus; Dieter Patzig, Ratingen; Dirk Trostmann, Witten, all of Germany

[73] Assignee: Taprogge GmbH, Germany

[21] Appl. No.: 356,206

[22] PCT Filed: Apr. 19, 1994

[86] PCT No.: PCT/EP94/01206

§ 371 Date: Dec. 19, 1994

§ 102(e) Date: Dec. 19, 1994

[87] PCT Pub. No.: WO94/23820

PCT Pub. Date: Oct. 27, 1994

[30] Foreign Application Priority Data

Apr. 20, 1993 [DE] Germany ............ 43 12 731.2

[51] Int. Cl.$^6$ ............ B01D 29/23; B01D 29/46; B01D 29/52; B01D 29/64
[52] U.S. Cl. ............ 210/108; 210/356; 210/396; 210/488
[58] Field of Search ............ 210/330, 333.01, 210/346, 350, 353, 356, 108; 411/486, 488, 396

[56] References Cited

U.S. PATENT DOCUMENTS

| | | | |
|---|---|---|---|
| 1,646,404 | 10/1927 | Herbert | 210/488 |
| 1,677,892 | 7/1928 | Herbert et al. | 210/488 |
| 3,006,478 | 10/1961 | Mueller | 210/356 |
| 3,568,842 | 3/1971 | Bozek | 210/488 |
| 3,622,003 | 11/1971 | Czech et al. | 210/356 |
| 4,402,829 | 9/1983 | Cordua | 210/488 |
| 4,430,232 | 2/1984 | Doucet | 210/488 |
| 4,707,259 | 11/1987 | Doucet | 210/356 |

FOREIGN PATENT DOCUMENTS

| | | | |
|---|---|---|---|
| 159961 | 10/1988 | European Pat. Off. | |
| 2559678 | 8/1985 | France. | |
| 907166 | 3/1954 | Germany. | |
| 7236018 | 12/1972 | Germany. | |
| 3300035 | 7/1983 | Germany. | |
| 3409036 | 8/1985 | Germany. | |
| 366031 | 1/1963 | Switzerland. | |
| 1273076 | 5/1972 | United Kingdom. | |
| 2239612 | 7/1991 | United Kingdom | 210/356 |

Primary Examiner—Joseph W. Drodge
Attorney, Agent, or Firm—Snell & Wilmer L.L.P.

[57] ABSTRACT

The invention relates to a backwashable filter, which comprises superimposed elements, particularly having an annular design, for producing filter candles. In the case of the filter candles the elements are subject to a radial throughflow from the inside to the outside in filter operation, whereas the flow direction is reversed for backwashing. On the inside of the filter layer is provided on each element a lip, elastically deflectable in the flow direction and facing the flow, which forms a gap opening with a fixed edge of the adjacent element. Under the action of the differential pressure of the flow acting on the wide front face of the lip, the lip performs a movement in which the gap opening is narrowed to a limited extent and as a result of the elastic deformation corresponding restoring forces are built up. If the flow is interrupted, particularly on passing from filter operation to backwashing operation, under the action of the restoring forces the lip automatically returns to its original position, so that the gap opening again becomes larger and in this way contaminants fixed in the gap opening are released and can be easily flushed out without leaving residues with the backwashing flow.

24 Claims, 10 Drawing Sheets

BACKWASHABLE FILTER HAVING ELEMENTS WITH ELASTICALLY DEFLECTABLE LIPS

BACKGROUND OF THE INVENTION

The invention relates to a backwashable filter, in which backwashing is brought about by reversing the flow direction, having a layer of superimposed elements made from an elastically deformable material, whereof in each case two adjacent elements form a gap through which a flow takes place, whose inflow side located on one side of the superimposed elements is the accumulation point for contaminations by particles such as sand grains, etc. and whose outflow side is formed on the other side of the elements, which are kept spaced apart from one another with the aid of spacing members such as studs or lugs located on the elements Backwashable filters have long been known. The elements normally comprise circular ring-shaped elements, which are superimposed as a layer for forming filter cartridges or candles. Filters of this type are e.g. used in steam condensers for filtering the cooling water or for conditioning the service water in the chemical and mechanical industries. The filter candles are generally placed on a filter plate, which has a number of holes corresponding to the number of filter candles. They form the access to the filter candles and consequently their filtering action occurs when there is a through-flow from the inside to the outside.

There are several possibilities available for the backwashing of filter candles. Firstly on the filter plate can rotate a suction shoe, which successively blocks access to each filter candle and with the aid of a suction pump places it under a vacuum or underpressure, whilst the filtering is continued in the remaining filter candles. In the filter candle subject to the suction pressure there is a reversal of the through-flow from the outside to the inside, so that the contaminants are rinsed away from the accumulation point and discharged from the candle. In place of a rotary suction shoe it is also possible to have a rotating filter plate, the suction shoe or shoes then being fixed. Diverging therefrom the filter plate can be subdivided on the inflow side into segments in the same number as the filter candles and each segment can be separately shut off and sucked off. There is then also a return flow of the filtered water from the outside to the inside through the filter candle and into the shut off segment and from there out of the filter housing, e.g. with the aid of a pipe.

German utility model 72 36 018 discloses a backwashable filter of the aforementioned type, in which the layerwise, superimposed elements form filter candles through which there is a flow from the inside to the outside. Each element comprises a ring or annular disk with inclined, movable tongues on the inside, which form pairwise, resilient, superimposed slits. The slits have on the inner edge of the tongues a relatively narrow opening cross-section and widen in the flow direction due to the inclined arrangement of the tongues. As a result of the elastic construction of the tongues they can be pressed apart during the backwashing process, so that the entrance cross-sections are correspondingly widened and contaminants jammed in the entrance area are freed during backwashing.

DE-OS 34 09 036 discloses a backwashable filter, in which the layer of superimposed elements in the form of filter candles is also formed from annular disks, through which there is a radial flow from the inside to the outside in filter operation. Two adjacent annular disks form a multiply subdivided annular clearance for the passage of the flow and which is constructed in such a way that the inner ends of in each case thinner annular disk portions are raised in the direction of a gap enlargement during the backwashing process from a thicker annular disk portion facing the gap spacing, so that any contaminants jammed in the annular clearance opening are freed during backwashing. The edge portion of the thinner annular disk consequently moves at right angles to the flow direction of the medium to be filtered or backwashed. This principle is also used in a block filter known from British patent 1 273 976. In place of the annular clearances there are rectangular gaps, whose one edge is formed by tongues, which can spring out transversely to the flow direction for gap enlargement purposes during backwashing.

European patent 159 961 discloses a backwashable filter, which has elastic spacers between the filter elements, as well as means able to vary the spacing between the filter elements by a corresponding change to the pressure exerted on the filter elements.

In the filter of the aforementioned type known from DE-OS 33 00 035 the annular disk-like, superimposed elements have inner Inclined and parallel spaced flanges. The flanges serve to deflect the flow, so as to improve the release of dirt particles which have collected in the gaps between the flanges during backwashing and bring about a prefiltering of the flow prior to its entry into the filter elements.

All the above-described filter systems are based on a common principle, according to which for influencing the size of the gap opening there is an elastic deformation of the elements bounding the gap openings transversely to the flow direction, i.e. transversely to the main direction of the forces exerted by the flow on dirt particles which have accumulated at the filter gap. As a result of these force conditions and the position and shape of the elastically deformable elements, dirt particles with dimensions approximately the same as the gap opening and particularly those which have wedge-shaped surface portions in the vicinity of the opening edges of the filter gap press away the elastic element bounding the latter by a wedge effect, so that the filter gap is widened accompanied by the building up of corresponding deformation forces and consequently dirt particles are Jammed in the gap opening with a specific clamping or Jamming force. During backwashing the Jamming forces securing the dirt particles can only be overcome if forces or deformations greater than the jamming forces are produced.

In the case of the filter known from European patent 159 961 for this purpose the external force acting on the stack of elements is reduced, so that the elements can be released from one another.

In the two other known filters the widening of the gap opening exclusively takes place through the described elastic deformation of the filter elements. This leads to the following relationships between the flow forces and the differential pressures at the gap opening during the filtering process and during the backwashing process. Shortly prior to initiating the backwashing process the filter has reached its greatest degree of contamination, the filter gaps are covered by dirt particles and the liquid to be cleaned flows at a higher speed and higher differential pressure through the still open residual gap opening. A 50% blockage of the gap opening increases the pressure difference to 400% compared with the clean filter and a 90% contamination leads to a 100 times pressure difference. As a result of the high differential pressures the dirt particles are forced with a very high force into the gap opening and jam, accompanied by the widening of said opening and as a result of the elastic deformation of the elements bounding the gap opening high jamming or retaining forces are built up.

During backwashing an increase in the size of the gap opening compared with the contaminated state is to be brought about. Therefore, in the vicinity of Jammed dirt particles there is a need for forces which are higher than the Jamming forces. As the gap opening at the start of the backwashing process can be freed immediately and without problem with respect to not Jammed dirt particles the return flow has a much larger gap opening available to it than shortly prior to backwashing. For the same water quantity flow there are consequently much smaller pressure differences and therefore much smaller forces than in the contaminated state.

Therefore the gap opening is not adequately widened, so that the Jamming of the dirt particles cannot be eliminated.

The negative effects of the pressure conditions and the strong clamping forces are further increased in that the long filter candles provided for large filter surfaces are subject to a lower velocity through-flow at their top during backwashing than at their bottom, so that the filter cartridges become irreversibly contaminated from the top until at the bottom a small residual surface is left which can still be cleaned by the backwashing flow.

In order to make difficult a widening of the gap opening in filter operation and a Jamming of dirt particles, attempts have been made to fit under pretension the elastic parts of the filter elements. However, this pretension must also be overcome for achieving a widening of the gap opening by the backwashing flow, so this merely leads to an increase in the problems during backwashing in the case of a pretensioning of the elastic parts.

Therefore the problem exists of so improving a backwashable filter of the aforementioned type that particles jammed in the gap opening can be more easily released than hitherto during backwashing, particularly at low flow velocities.

SUMMARY OF THE INVENTION

According to a preferred embodiment of the invention this problem is addressed in that each element carries on its inflow side a lip elastically deflectable in the flow direction and facing the flow with its wide front face, whose opening edge forms the gap opening with the facing, fixed opening edge of the adjacent element, and that supports are positioned alongside the lip and whose facing side spaced from the lip allows a small movement of the lip in the flow direction until the lip strikes against said side, and the spacing of the opening edge of each lip from the facing, fixed opening edge of the adjacent element— starting from the position without loading by flow forces, on the path of the elastic deflection or elastic deformation of the lip decreases in the flow direction until striking the side of the support arranged alongside the lip, so that a particle jamming in the gap opening with the flow exerts a driving force on the opening edge of the lip which narrows the gap opening.

Thus, diverging from the practice adopted hitherto, in accordance with the present invention, the layerwise, superimposed elements for the formation of a filter are so constructed that the elastically deformable parts bounding the gap opening, for example, an elastically deflectable or elastically deformable lip, under the influence of particles moving into the opening gap do not diverge in the direction of increasing the size of the opening gap and instead bring about a reduction in the size of said gap, so that dirt particles are prevented from deeply penetrating the gap opening with the consequence of the build-up of high clamping forces. The lip constructed a preferred embodiment of the invention on the inflow side of each element carries a substantially wide front face facing the flow and on which the pressure difference of the flow is Just as effective as on a dirt particle penetrating in jamming manner the gap opening, so that the forces exerted in the flow direction by the flow pressure on the front face of the lip increase substantially in the same proportion as the forces under which the dirt particles are pressed into the gap opening. The gap opening is defined by the spacing of the opening edge of the lip from the facing, fixed opening edge of the adjacent element in the filter stack. Strengthening flow forces, such as in the case of an increased pressure difference due to a corresponding contamination of the filter, bring about a deflection of the elastically deflectable or elastically deformable lip always in the direction of an opening gap narrowing, if the spacing of the opening edge of each lip from the facing, fixed opening edge of the adjacent element decreases from the unloaded state on the path in the flow direction—namely by elastic deflection or deformation of the lip due to the forces applied—up to the stop provided on the side of the associated support. An expansion of the gap opening in accordance with the prior art is consequently rendered impossible because, as stated, high driving in forces acting on the dirt particles are confronted by correspondingly high flow forces acting on the elastically deflectable lip and prevent an opening gap-widening effect of the driving in forces.

The supports placed alongside the lip according to the invention limit the deflection movement of the lip, so that a clearly defined, lower opening gap width is maintained. The fundamental interaction between the increase of the flow forces acting to the same extent on the wide front face of the lip and on the dirt particles and the elastic deformability of the lip in the direction of an opening gap narrowing is not affected by the supports. Therefore the supports can be omitted if it is possible to accept a more extensive deformation of the lips than is allowed by the supports, or if in some other way it is possible to ensure a controlled deformation of the lip also under high differential pressures.

It is pointed out that each element has the same configuration, i.e. a single element type is used for filter layer formation.

A particularly effective further development of the invention consists of the lip being elastically deflectable by a small differential pressure of the flow for striking against the sides of the supports. As soon as the flow is interrupted for initiating a backwashing process and consequently the differential pressure at the lip is eliminated, under the action of the elastic restoring forces the lip returns to its initial position, so that the gap opening is correspondingly widened. Dirt particles jammed in the gap opening are consequently freed of their own accord prior to the start of backwashing. As the self-widening effect of the gap opening is independent of the forces brought about by the backwashing flow, the invention allows a completely satisfactory backwashing of even very long filter candles with a limited backwashing flow. A Jamming of dirt particles with dimensions approximately the same as the gap opening is avoided according to the invention, because the gap opening is controlled even in the case of a limited through-flow in filter operation and by limiting the deflection of the lip by the supports is even slightly reduced in a predetermined amount and if the flow is maintained, as stated, is widened again without backwashing forces as a result of elastic restoration. In this embodiment of the invention, if relatively small differential forces bring about a marked elastic deformation of the lip so as to narrow the opening gap, the supports are necessary for limiting the deflection or elastic deformation of the lip, unless the deflection is controlled in some other way.

As a result of the elastic deflectability or elastic deformability of the lip according to the invention, the material is primarily constituted by a correspondingly elastic plastic.

On respecting the features and conditions according to claim 3, in preferred manner it is ensured that dirt particles jamming in the gap opening cannot press on or widen the opening gap and instead the resultant forces bring about a narrowing of the gap opening. The details concern the standard friction pairs between the edges of the elements bounding the gap opening and the dirt particles.

The application of the invention to annular elements, particularly those which are superimposed for forming a filter candle is preferred, but the illustrated advantages and effects are also obtained on elongated filter layers, which are positioned transversely in a flow of a medium to be filtered.

DESCRIPTION OF DRAWING FIGURES

Embodiments of the invention are described in greater detail hereinafter relative to the attached drawing figures which show.

DETAILED DESCRIPTION OF A PREFERRED EXEMPLARY EMBODIMENT

Figure 1:
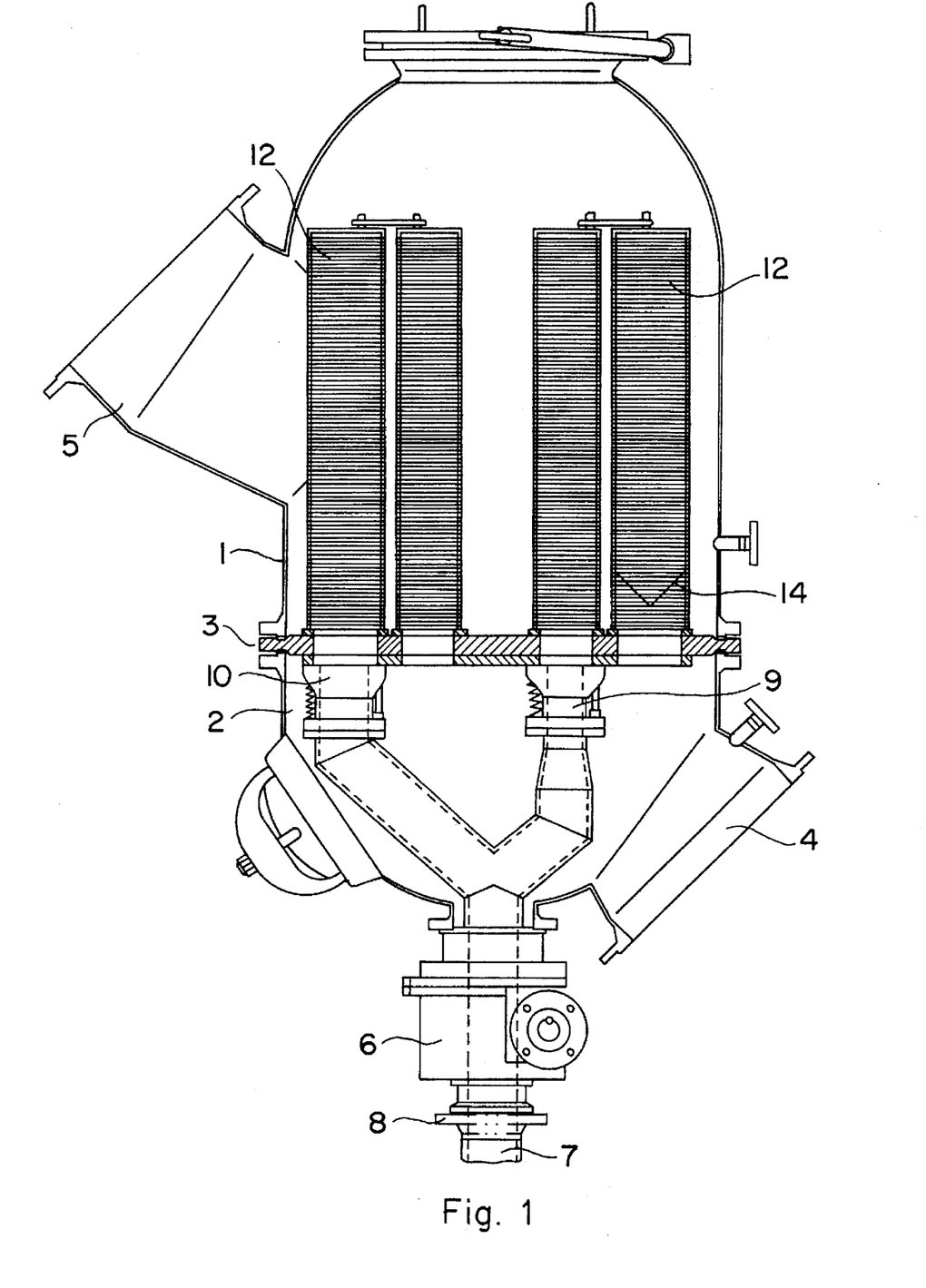
FIG. 1 A longitudinal sectional view through a first embodiment of a filter.

FIG. 1 shows an embodiment for a filter according to the invention, which can be placed between the flanges of two corresponding pipes in order to e.g. filter service water. For this purpose an inlet 4 and an outlet 5 are arranged equiaxially to one another. The inlet 4 belongs to a lower housing part 2, whilst the outlet 5 belongs to an upper housing pert 1. The two housing parts are interconnected, whilst enclosing a filter plate 3. The plane of division between the two housing parts 1 and 2 is at an angle of 45°. By rotating one housing part relative to the other it is also possible to obtain other flow configurations, e.g. a 90° deflection from the horizontal into the vertical upwards or downwards.

The filter plate 3 carries several filter candles 12, which form part of the backwashable filter. On the side of the filter plate 3 remote from the filter candles 12 there are two suction shoes 9 and 10, which are suitably connected to a common suction pipe 7, which is in turn is suitably connected to the suction side of a not shown pump. Suction shoes 9 and 10 are rotated with the aid of a gear 6 and a rotary connection 8 ensures that the suction pipe 7 is stationary whilst the two suction shoes 9 and 10 can rotate. It is clearly possible to see in FIG. 1 the flange for the connection of an electric motor to the gear 6.

Each suction shoe 9, 10 suitably engages in sealing manner on the underside of the filter plate 3, which is substantially completely smooth, i.e. the suction shoes allow the sliding over the filter plate without suffering damage. In the case of strong contamination of the liquid to be filtered the liquid is continuously sucked off by means of the suction pipe 7 and the two suction shoes 9, 10 rotate continuously with the aid of the gear 6 and the associated drive. The following process takes place. The liquid flowing into the inlet 4 flows via the holes in the filter plate 3 into the filter candles 12 through which there is a radial flow from the inside to the outside. As will be explained hereinafter, on the inside of the filter candles 12 there are gap openings, which form the inlet for gaps radially penetrating the candles 12, as well as the accumulation point for contaminants. If a suction shoe 9 or 10 just covers the hole of an associated filter candle 12, there is a reversed flow through the candle 12. The already filtered liquid located in the housing part 1 now passes through the individual annular gaps from the outside into the inside of the filter candles 12 and as a result of this backwashing accumulated contaminants are discharged via the suction shoe into the suction pipe 7. As soon as the suction shoes 9 and 10 have rotated further, so that the hole of the associated filter candle 12 is again made available for the free inflow of the liquid to be filtered, the flow is again reversed and the filtering process starts anew on said filter candle 12.

Figure 2:
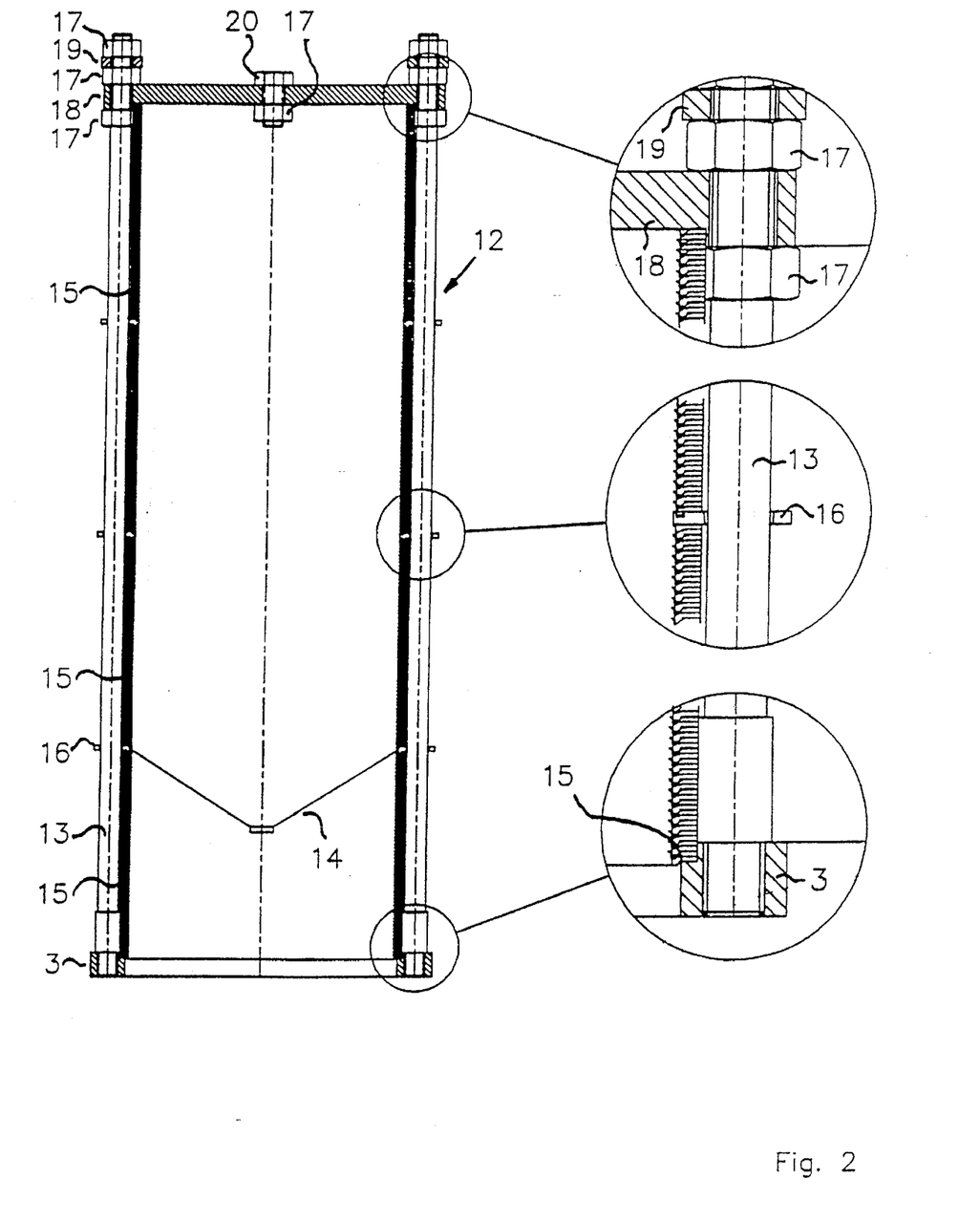
FIG. 2 A longitudinal sectional view through a filter candle of the filter shown in FIG. 1.
Figure 3:
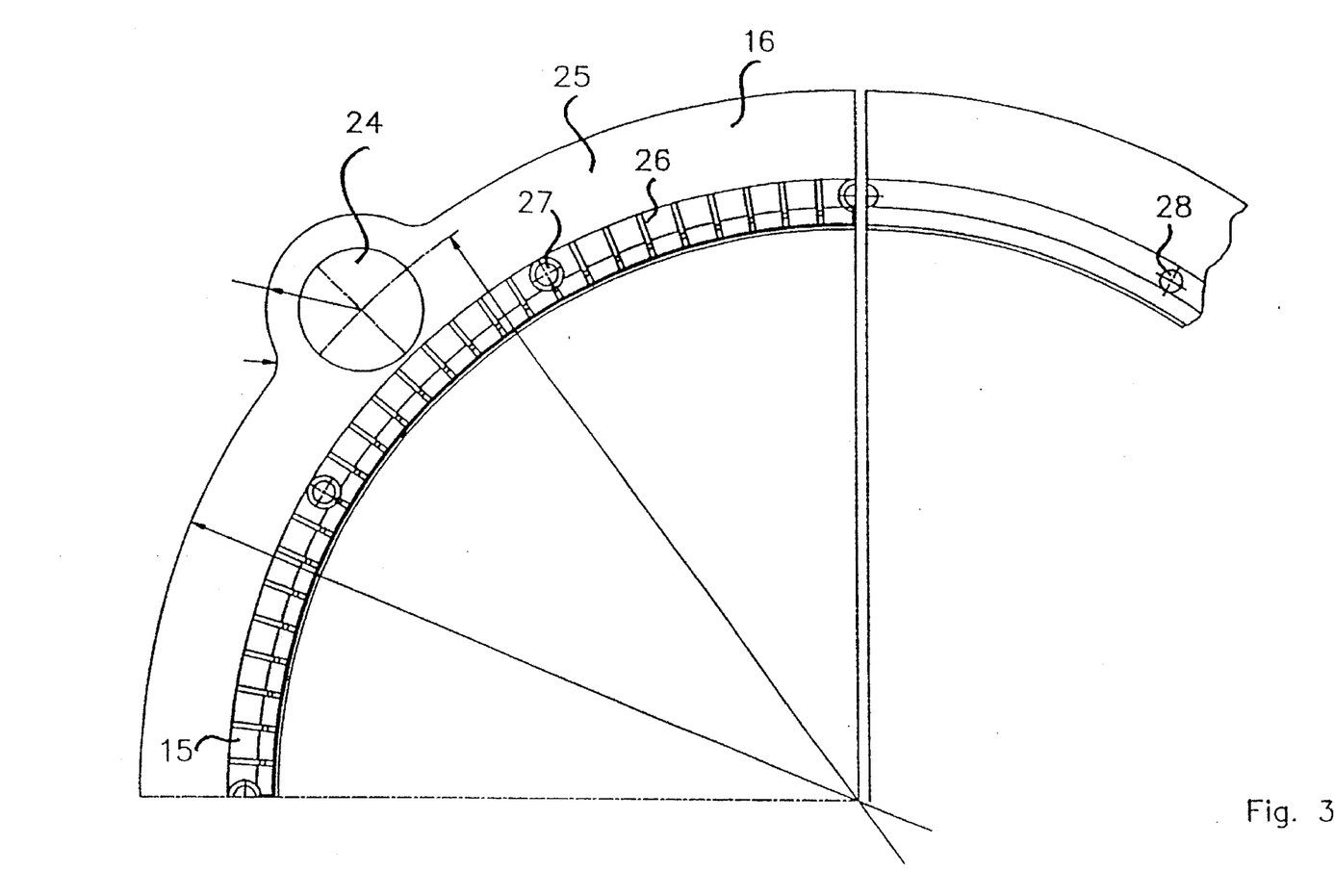
FIG. 3 A plan view of an intermediate ring in the filter candle of FIG. 2.

The details of a filter candle 12 are shown in FIG. 2. Into the filter plate 3 are screwed a total of four bolts 13, whose free end is fixed by a lid 18. The bolts 13 penetrate holes 24 (FIG. 3) in the edges 25 of intermediate rings 17, which are arranged at regular intervals between further annular elements 15, the latter forming the actual filter component. On the upper end of each bolt 13 there are three nuts 16 and an adjacent filter candle for stiffening interconnecting tongues 19 in order to be able to retain in a clearly defined manner the stack formed by the annular elements 15 and the intermediate rings 16. This means that the stack formed from the annular elements 15 is not squeezed under the inclusion of the rings 16, but also has no space to deflect. Instead all the annular elements 15 and intermediate rings 16 are held in fixed manner without being deformed. In the centre of the lid 18 there is also a bolt 20 with a nut 17, which are not used in the present case. At this point the individual filter candles 12 of a housing part can be fixed to one another, so that adequate stability exists.

Level with the bottom intermediate ring 16 a coarse rake 14 is installed in the filter candle 12 and ensures that coarse contaminants cannot penetrate deeply into the candle 12. In fact the coarse rake 14 keeps them in the bottom area of the filter candle 12. This ensures that the contaminant is discharged if the associated suction shoe 9 or 10 is positioned above the hole of the candle 12. Due to the violent flow at this point and due to the short path a discharge of the contaminant is ensured. The coarse rake 14 is a simple plastic part with a disk and radially projecting clasps, which are fixed to the corresponding intermediate ring 16.

Figure 8:
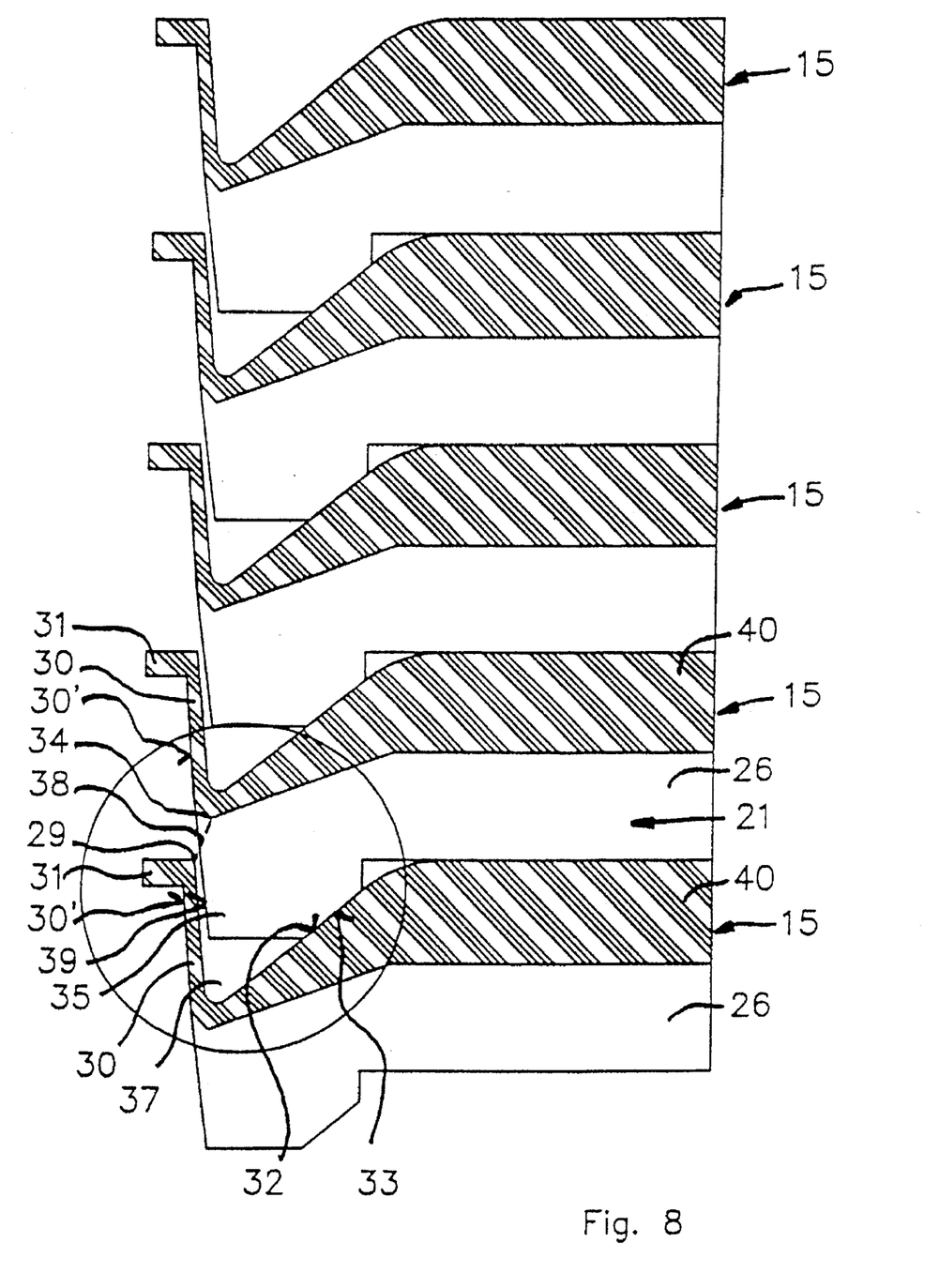
FIG. 8 A cross-sectional view of five annular elements superimposed to form a filter layer in accordance with the embodiment of FIGS. 4 to 7.
Figure 9:
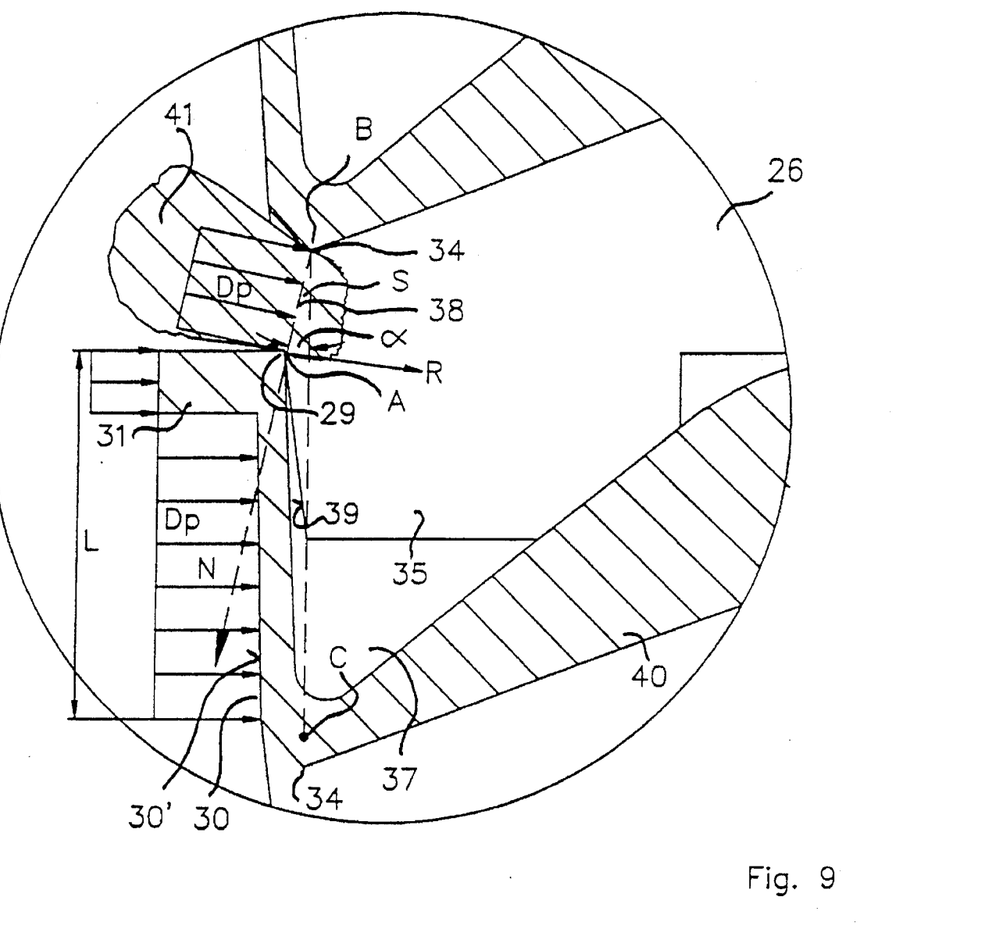
FIG. 9 A larger-scale view of the detail encircled in FIG. 8 representing two elements in the vicinity of the gap and a lip for illustrating the geometry in this area, as well as the force conditions when a particle penetrates the gap opening.
Figure 10:
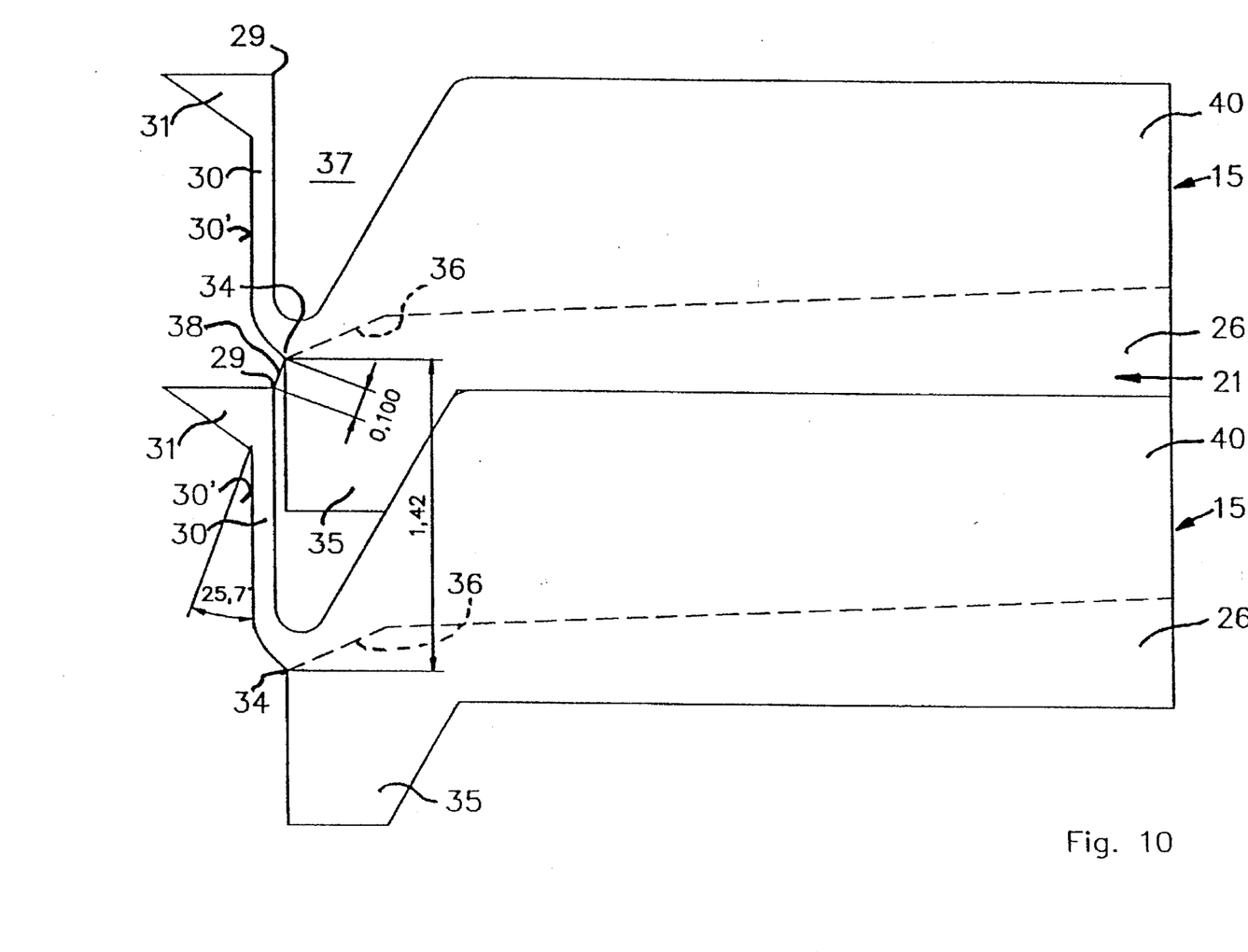
FIG. 10 A diagrammatic representation of a further example of two superimposed annular elements for forming an annular gap of a filter subdivided by webs.

Hereinafter the operation of the annular elements 15 is explained in greater detail, FIGS. 4 to 9 relating to a single preferred exemplary embodiment, whereas FIG. 10 gives a somewhat modified form. FIGS. 8, 9 and 10 clearly show the annular gap 21, which is formed between two adjacent annular elements 15.

Figure 4:
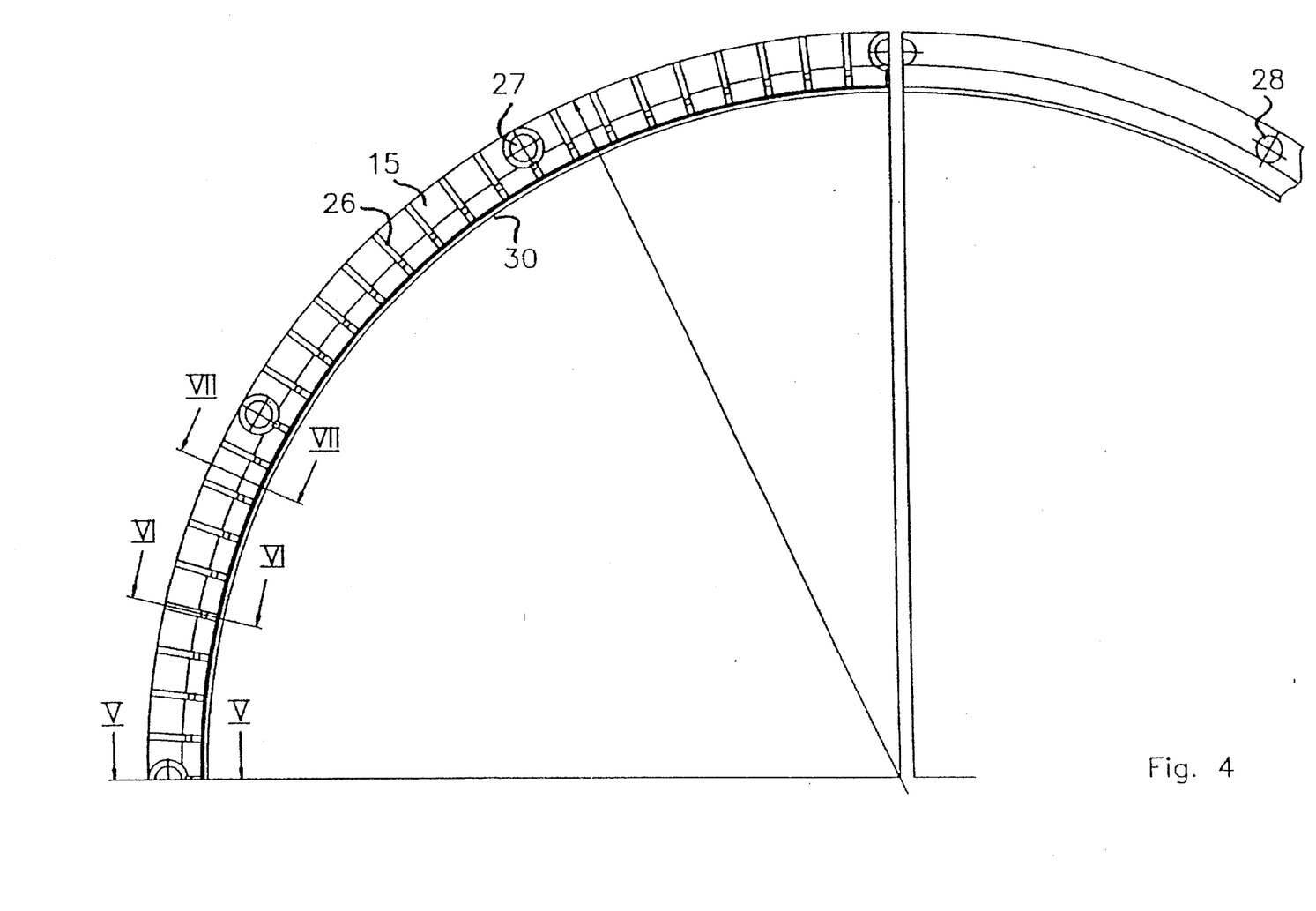
FIG. 4 A plan view of an annular element for forming a filter candle according to an embodiment of the invention.

The left-hand half of FIG. 4 shows a quarter of an annular element 15, namely its underside, relative to the arrangement of the filter candle 12 according to FIG. 2. The underside carries at regular intervals radial webs 26, which rest on the smooth top surface of an annular element 15, positioned below the same. The substantially smooth top is shown as a detail in the right-hand half of FIGS. 3 and 4. The webs 26 ensure that two adjacent annular elements 15 for the formation of the annular gap 21 have a predetermined, constant spacing and can be placed on one another in pressure-stable manner. For fixing the individual annular elements 15 to one another each underside is provided with several, uniformly circumferentially distributed pins 27, which are inserted in corresponding pinning holes 28 on the smooth top of the annular elements 15 and are slightly secured therein.

Figure 5:
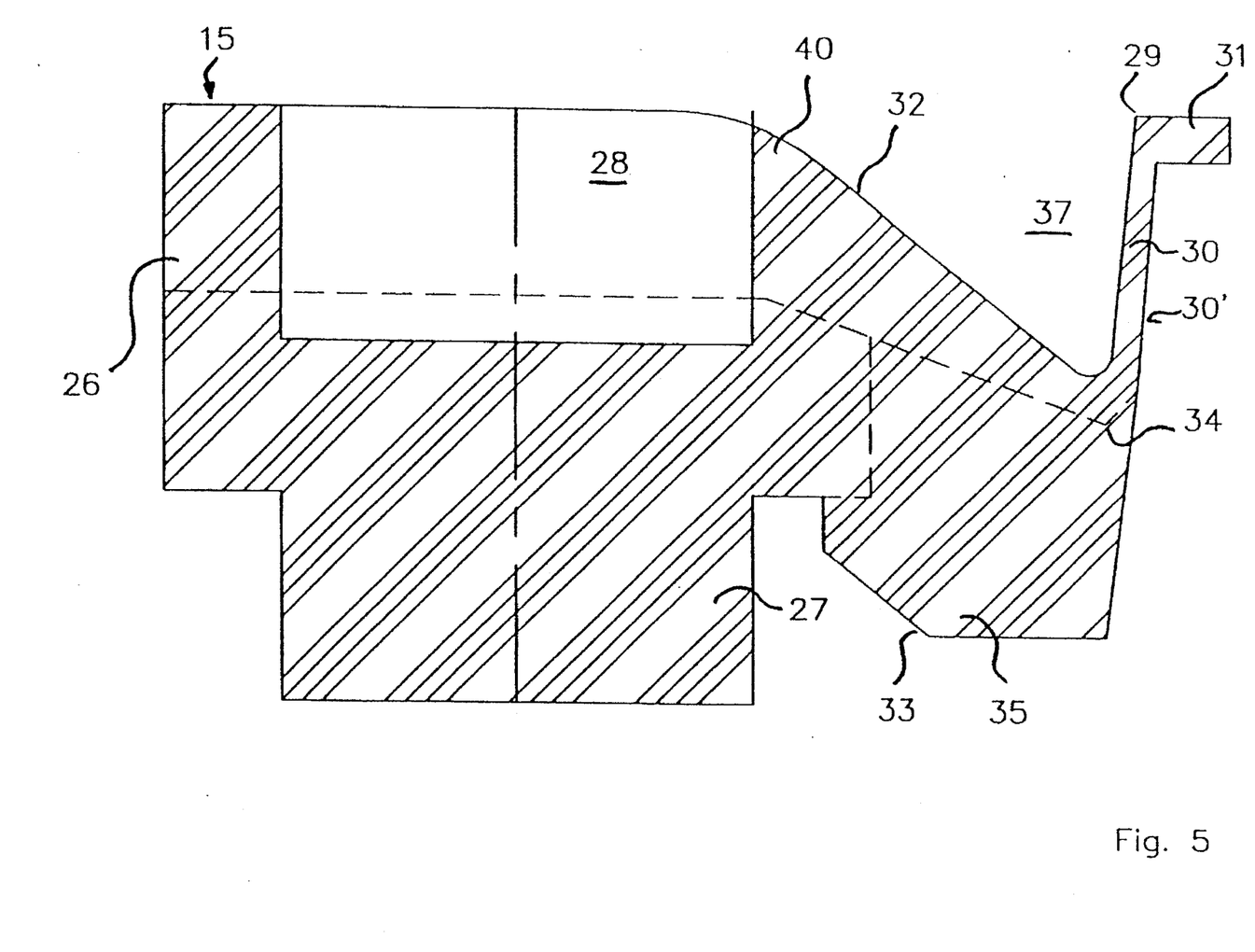
FIG. 5 A cross-sectional view along line V—V of FIG. 4.

FIG. 5 is the sectional view of a point on an annular element 15 on which is located a guide pin 27 and a pinning hole 28. It can be clearly seen that the guide pin 27 is in the vicinity of a web 26. The pinning hole 28 extends through an annular body 40, which forms the main part of the annular element 15. By a corresponding material accumulation around the guide pin 27 it is ensured that each pinning hole 28 is a blind hole, i.e. each guide pin 27 can engage in the adjacent pinning hole 28. In order to waste the minimum filter capacity, the intermediate ring 16 shown in fig. S can also be provided with webs 26 and with guide pins 27 and pinning holes 28. For stability reasons each intermediate ring 16 is preferably thicker than each annular element 15, as can be gathered from FIG. 2.

Figure 6:
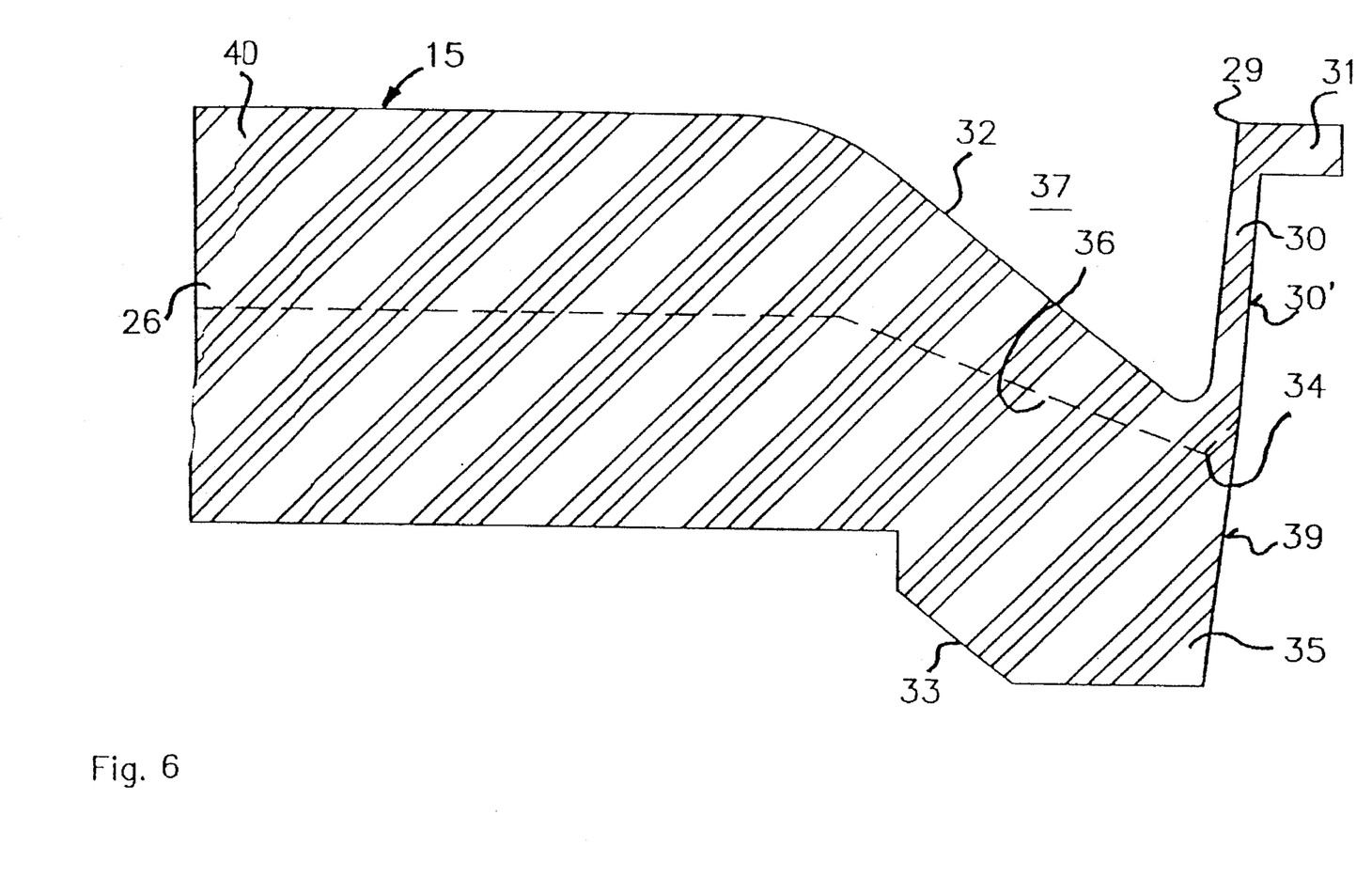
FIG. 6 A cross-sectional view along line VI—VI of FIG. 4.
Figure 7:
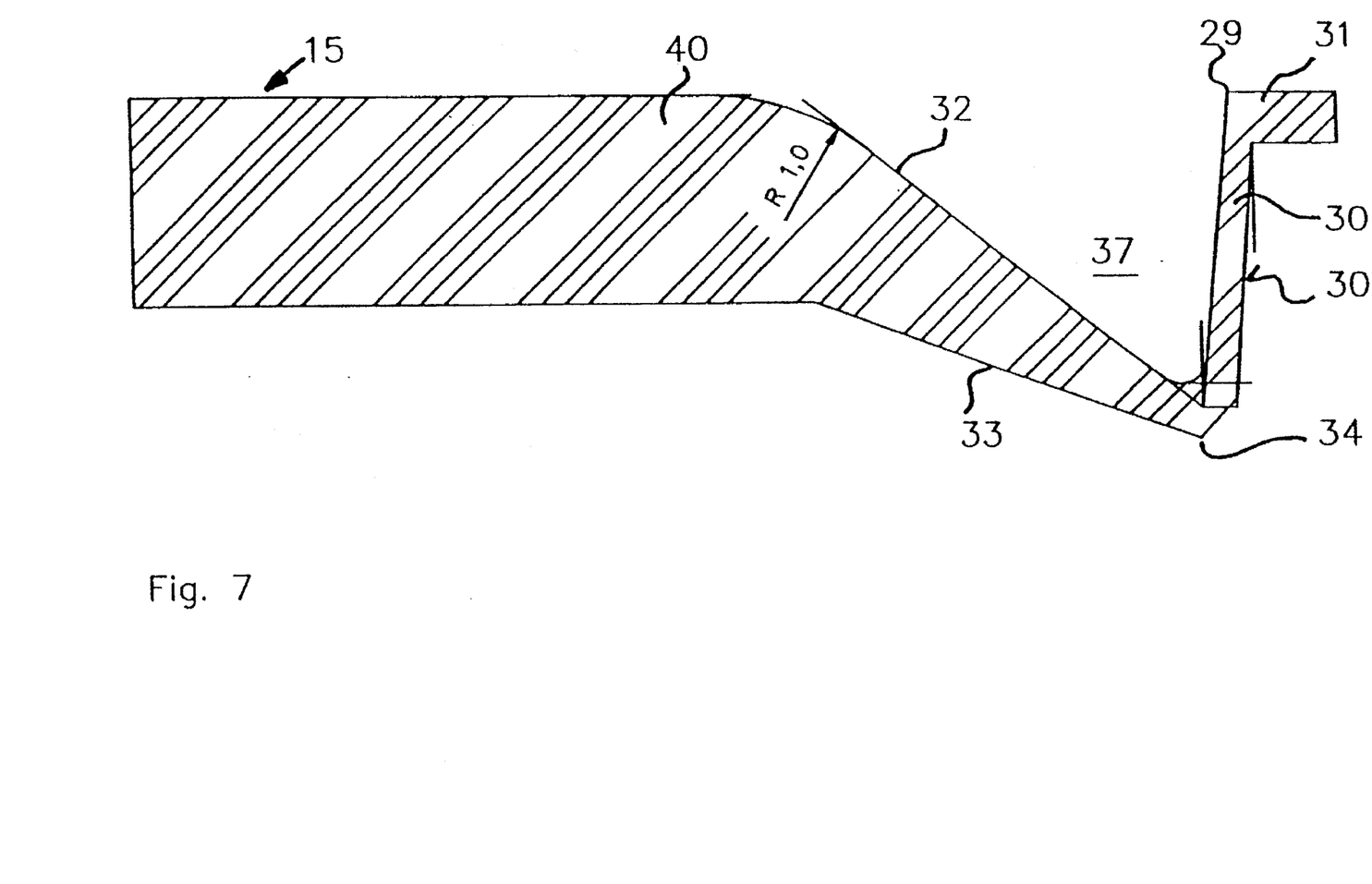
FIG. 7 A cross-sectional view along line VII—VII of FIG. 4.

FIGS. 6 and 7 constitute a sectional view of the annular element 15 in the vicinity of the web 26 or outside the web 26 (FIG. 7). The separating line between the body 40 and the web 26 is indicated in broken line form in both FIGS. 5 and 6. On the inside of each annular element 15 is provided a lip 30, which has on its free end a bead 31. Between the lip 30 and the body 40 there is a cavity 37, in which when the annular elements 15 are assembled projects a support 35 as a portion of the web 26. An inclined face 32 on the edge of the cavity 37 corresponds to an inclined face 33 on the support 35. When the annular elements 15 are assembled (cf. FIG. 8), both the inclined faces engage on one another. The embodiment shown in FIGS. 5 to 7 in the case of assembled annular elements 15 leads to a gap opening 38 with a height of approximately 0.3 mm. The boundary of the annular gap 38 is on the one hand formed by an opening edge 29 of the lip 30 and on the other by a fixed opening edge 34, which is obtained at the transition from the lip 30 to the body 40 by an angular design of the surface and this detail can be particularly clearly gathered from FIGS. 8 and 9.

The interengaging of superimposed annular elements 15 for forming a filter layer is particularly clearly apparent from FIG. 8, in conjunction with FIG. 9. By means of FIG. 9 the operation of the filter in the vicinity of the gap opening 38, as well as the lip 30 and adjacent parts will be explained. In FIG. 8 the represented layer of superimposed, annular elements 15 is in the inoperative state or in the switching point between filter operation and backwashing operation and in each case no flow forces act on the wide front faces 30' of the lips 30 located to the left in the drawing. The rear face of the lip 30 is therefore spaced from the side 39 of the support 35 facing the lip 30. The gap opening 38 is indicated by a dotted line between the elements 15 provided with reference numerals and extends from the opening edge 29 of the lip 30 to the fixed opening edge 34 at the transition from the lip 30 to the body 40. FIG. 9 shows the encircled area of FIG. 8 in filter operation. Under the influence of the flow forces acting on its front face (linear loading Dp) the lip 30 is deflected elastically radially outwardly around an imaginary fulcrum C and namely until in the represented manner it strikes against the side 39 of the support 35. As a result of the rotary movement around the imaginary fulcrum C the opening edge 29 of the lip 30 has correspondingly migrated to the right, with reference to the drawing, so that the distance to the fixed opening edge 34 and correspondingly the width s of the opening gap 38 has decreased.

If a particle 41 of the represented shape and size has been flushed into the gap opening 38 and the flow forces (pressure difference Dp) attempt to drive the particle 41 more deeply into the gap opening 38, the flow forces acting along the front face 30' on the lip 30 prevent any enlargement or widening of the gap opening 38, so that the particle 41 cannot more deeply penetrate said opening and cannot be jammed deeply in said opening 38. As soon as the flow is interrupted on passing to backwashing operation, the pressure on the front face 30' of the lip 30 decreases and the lip 30 returns to its inoperative position, in that it performs a rotary movement in the counterclockwise direction about the fulcrum C and in said inoperative position no elastic deformation forces act thereon. As a result of the automatic restoring of the lip 30 to the inoperative position the gap opening 38 is enlarged to its original width, so that the clamping forces retaining the particle 41 are eliminated and consequently said particle is released. With the backwashing flow which then occurs the particle, as well as the other deposits, are easily removed and discharged.

The represented geometry and the resulting forces acting on the lip 30 and the particle 41 will now be explained. The gap opening 38 is bounded by the opening edges 29, 34 represented as dots A and B. The lip 30 of length L is assumed as rotatable about the imaginary fulcrum C. The three points or dots A, B and C form with the lengths L and s a triangle with the angle $\propto$. The lip 30 has been applied to the support 35 with only a small pressure difference at point A. The lip 30 and the particle 41 are in the meantime loaded by a higher pressure difference, which is represented as a linear load Dp. At the opening edges 29, 34 the particle 41 produces frictional forces and normal forces. In the least favourable case with a very small wedge angle (as shown), the frictional force R occurs perpendicular on s and the normal force N is in the direction s.

The force L×Dp acts on the lip 30 and consequently in the direction of a narrowing of the gap opening 38. The force R is equal (Dp×s/2) and N is equal (R/RW), RW being the friction coefficient. The force N acts in the direction "enlarge cap opening" and the force R in the direction "narrow gap opening".

In order that the gap opening 38 clearly opens on backwashing and the associated restoring of the lip 30, so as to reliably release adhering contaminants or jamming particles 41, but does not narrow, which would definitely lead to a jamming of the particles 41, on the one hand the angle $\propto$ must be well above zero and on the other the influence of the force N acting in the direction of increasing the gap opening 38 increases with larger angles ∝. Therefore the length L and the angle ∝ must be so matched to one another and to the width s of the gap opening 38 that for the possible range of the friction coefficient RW the resulting sum of the forces which occur act in the direction of "gap narrowing". In a practical example L/s=3 and the angle ∝=13°. These conditions also permit unfavorable friction pairs and are consequently very reliable. claim 3 gives a dimensioning rule for the angle ∝.

In the embodiment according to FIG. 10, as indicated therein, there is a much narrower gap opening 38 of only 0.1 mm and the bead 31 and cavity 37 are slightly different as compared with the previously described embodiment. The function and action mechanism are fundamentally the same. It can be clearly seen that the connecting line from the opening edge 29 of the lip 30 to the fixed opening edge 34 when the lip 30 passes into the body is at an angle of 25.7° to the central axis of the filter candle 12, the opening edge 29 of the lip 30, considered radially, being further to the inside.

If, in much the same way as in the embodiment of FIG. 9, a particle such as a grain of sand with a wedge-like shape has been flushed into the gap opening 38, the here not shown particle as a result of the hydraulic pressure attempts to penetrate more deeply into the gap opening 38 and correspondingly widen the latter. The lip 30, its bead 31 respectively are in this case displaced downwards to the left by the sand grain, with respect to the drawing. However, in fact there Is a completely different movement on the part of the lip 30, if the flow forces and therefore also the hydraulic pressure on the sand grain increase, namely a clockwise deflection of the lip 30 about a fulcrum located in the transition area between the base of the lip 30 and the body 40, so that the opening gap 38 narrows and consequently the sand grain cannot penetrate more deeply into the gap 38. The deflection of the lip 30 takes place, because the hydraulic pressure acting on the front face 30' of the lip 30 correspondingly elastically deforms the latter until it engages on the support 35. However, this position can already be brought about on using a relatively low hydraulic pressure if the elastic deformability of the lip 30 is correspondingly designed and preference is given to this embodiment. A stiffer lip construction requires a higher pressure difference for the elastic deformation of the lip 30 than in the deformation area, e.g. in the transition area between the lip 30 and the body 40 a correspondingly weaker and less stiff construction. However, what is also decisive here is that each radially outwardly directed elastic deformation or elastic deflection of the lip, with respect to the filter candle 12, builds up corresponding elastic restoring forces, which act immediately if the flow is interrupted, particularly on passing from filter operation to backwashing operation. Thus, the elastic restoring forces bring about a restoring of the lip 30 to the inoperative position spaced from the support 35, as shown in FIG. 10, with the consequence of a corresponding widening of the gap opening 38, so that particles located or held there are detached and can be easily flushed out by the starting backwashing flow.

The contour 36 of the side of each body 40 adjacent to the cavity 37 ensures that there are no undesired deposits in the gap 21.

FIG. 10 clearly shows that the gap 21 for the flow between the opening edges 29 and 34 widens outwards between the webs 26, not only due to the radial arrangement of the webs 26, but also due to the increase in the reciprocal spacing of the flat sides of the body 40. This construction does not represent a condition for successful filtering and backwashing. However, as a result of the thus formed diffuser on the outside of the filter candle 12 there is a pressure rise, which reduces the flow losses. It also helps to prevent a jamming of particles 41. FIG. 10 also clearly shows that for each element 15 a construction height of 1.42 is required, in order to form a single annular gap 21 for filtration purposes. Measured on known candle filters, this value is excellent. As a result of the low construction height of each element 15 it is possible to produce a shorter filter cartridge 12 for the same filtering capacity, which is advantageous for the backwashing velocity through the annular gap 21 in the vicinity of the lid 18. The elements 15 are made from a plastics material, which can be easily injection moulded, is dimensionally stable and is in particular non-deformable with respect to the medium to be filtered.

The above description has made it clear that the self-cleaning effect during backwashing or when the through-flow is stopped is brought about by the elasticity of the lip 30. These effects more particularly occur in the previously calculated form if the facing edge 34 is especially stiff and this condition is fulfilled in the invention. In the vicinity of the edge 34 the web portion 35 passes into the ring body 40, so that there is an excellent stabilization of this material area of each element 15. The edge 34 can otherwise be completely freely designed, because at this point it is merely necessary to shape the transition from the lip 30 to the ring body 40. Thus, an angular or rounded transition falls within the scope of the random activity of the designer.

We claim:

1. An improved backwashable filter in which backwashing is accomplished by reversing a flow direction, having a layer of superimposed and axially aligned elements made of an elastically deformable material, where each two adjacent of said elements form a gap through which a flow takes place, the elements having a connecting body, an inflow side located on one side of the elements and forming an accumulation point for contamination by particles, and an outflow side formed on the other side of the elements, the improvements comprising:

spacing members located on said elements adapted to space apart said elements from one another in a generally fixed manner;

a lip, on said inflow side of each said element, said lip being elastically deflectable in the flow direction and facing the flow direction, said lip having a wide front face;

wherein, for each element, a support is positioned alongside said lip, said support having a facing side spaced from said lip such that said lip, when being elastically deflected in the flow direction, is allowed to move until said lip strikes against said facing side; and the gap being formed between a first opening edge of one element and a second opening edge of an adjacent element;

wherein, for each element, said first opening edge comprises said deflectable lip and said second opening edge comprises a fixed portion of said adjacent element, such that said lip is elastically deflected in the flow direction from its position exhibited without being subjected to flow forces to a position wherein the lip strikes the facing side of the support arranged alongside the lip so that the gap opening is narrowed and a particle is jammed into the narrowed flap opening.

2. A filter according to claim 1, wherein, for each element, said lip is elastically deflectable even by a small differential pressure of flow until said lip strikes against the facing side of the support arranged alongside said lip.

3. A filter according to claim 1, wherein for each element, an angle α, determined by a length L of the lip and a width s of the gap opening, as well as by a position of an axis C of the elastic deflection of the lip, the first opening edge of one element and the second opening edge of the adjacent element, has a value zero to max.(7×L/s) and is max. 90°.

4. A filter according to claims 1, wherein the superimposed elements are annular and form a filter candle.

5. A filter according to claim 4, wherein the annular superimposed elements are circular and the gaps formed between said elements extend radially.

6. A filter according to claim 5, wherein the flow direction in filter operation is from the inside of said filter candle to the outside and the lips are in each case located on an inside of the annular elements.

7. A filter according to claim 6, wherein, for each element, said lip is between a free end and the fixed edge is substantially constructed as a thin wall and said circular elements form a cylindrical ring.

8. A filter according to claim 1 wherein, for each element, the lip forms a cavity between it and the connecting body in the flow direction.

9. A filter according to claim 8, wherein, for each element, said cavity is provided on a side of the element facing the connecting body with an inclined face, corresponding with a same inclination to an inclined face of the support which projects into the cavity.

10. A filter according to claim 9 wherein, for each element, the connecting body of the adjacent element opposite to the cavity has a contour widening in the flow direction.

11. A filter according to claim 1 wherein said support on each element is fitted to a side remote from the lip and provided for deformation-limiting engagement with the lip of an adjacent element.

12. A filter according to claim 1 wherein, for each element said support are constructed in the flow direction and spaced behind the lip on the same element as the lip in the form of webs and are provided for a deformation limitation of said lip.

13. A filter according to claim 12, wherein, for each element support is web-like and constructed in spaced manner behind the lip on the same element as the lip are in one plane with the webs separating the elements from one another.

14. A filter according to claim 1 wherein, for each element the lip has on a free end a bead reinforcement.

15. A filter according to claim 1 wherein, for each element, the second opening edge of the element forming the gap opening is formed by an angular transition from the connecting body to a fixed end of the lip.

16. A filter according to claim 15, wherein, for each element, the facing side of each support serving as a stop for the lip passes into the connecting body at a point which is located at the second opening edge of each element.

17. A backwashable filter, comprising:

a layer of superimposed elements made from an elastically deformable material, where each two adjacent of said elements form a gap through which a flow takes place, said elements having a connecting body, an inflow side located on one side of the elements and forming an accumulation point for contaminations by particles such as sand grains, and an outflow side formed on the other side of the elements;

spacing members located on said elements adapted to space apart said elements from one another;

a lip on the inflow side of each said element, for each element said lip having a wide front face, an upper edge defining a first opening edge and a lower edge defining a second opening edge, said lower edge being connected to the connecting body and said lip extending upwardly therefrom such that a cavity is formed between the lip and the connecting body, wherein the first opening edge forms a flap opening with the second opening edge of an adjacent element, and wherein said cavity allows the lip to be elastically deflectable in the flow direction; and wherein least one support, for each element, adjacent said lip, said at least one support having a facing side spaced from said lip such that said facing side allows a small movement in the flow direction of said lip until said lip strikes against said facing side of said at least one support;

wherein the gap opening formed between the first opening edge of the lip and the facing, fixed second opening edge of the adjacent element being reduced by the elastic deflection of the lip, starting from a position without loading by flow forces and decreasing in the flow direction until striking the facing side of the at least one support arranged alongside the lip, so that a particle jamming in the gap opening with the flow exerts a driving force on the opening edge of the lip which narrows the gap opening.

18. A filter according to claim 17 wherein each element (15) has uniformly distributed pinning holes on one side and guide pins on the other side for reciprocal fixing of said elements.

19. A filter according to claim 18 characterized in that intermediate elements project over the elements and having holes for the insertion of bolts provided for the stabilization of a filter candle formed from the elements.

20. A filter according to claim 17, wherein the superimposed elements are circular and the gaps formed between said elements extend radially, and further wherein intermediate circular elements project over the elements having holes for the insertion of bolts provided for the stabilization of a filter candle which formed from the elements.

21. A filter according to claim 17 further comprising a coarse rake close to an entrance of the filter candle for collecting large contaminants.

22. A filter according to claim 17 wherein the elements form filter candles are arranged on different radii on a filter plate.

23. A filter according to claim 17 wherein the elements are constructed of an elastic and dimensionally stable plastics material, which material is deformation resistant with respect to a medium to be filtered.

24. A filter having improved backwashing capabilities comprising:

a plurality of filter elements arranged one on top of the other to form a filter candle evidencing a longitudinal axis, said stacked elements being separated by at least one support substantially disposing said elements at a predetermined spacing;

said elements defining a gap between a lower most portion and an upper most portion of adjacent elements;

said elements each having a body terminating at a distal inflow end in a lip, said lip extending upwardly from a cavity formed in said body;

wherein, for each element, said at least one support is attached to said element proximate said cavity and has portion thereof extending upwardly; and wherein, for each element, said lip is radially deformable about said filter candle axis in spaced relation from a respective upward extension of said at least one support to a position proximate said upward extension of said respective support to narrow said gap between adjacent elements.

* * * * *